(12) United States Patent
Iwashita

(10) Patent No.: US 11,385,445 B2
(45) Date of Patent: Jul. 12, 2022

(54) SINGLE-FOCUS LENS SYSTEM AND CAMERA

(71) Applicant: Panasonic Intellectual Property Management Co., Ltd., Osaka (JP)

(72) Inventor: Tsutomu Iwashita, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 357 days.

(21) Appl. No.: 16/636,845

(22) PCT Filed: Jul. 27, 2018

(86) PCT No.: PCT/JP2018/028173
§ 371 (c)(1),
(2) Date: Feb. 5, 2020

(87) PCT Pub. No.: WO2019/031266
PCT Pub. Date: Feb. 14, 2019

(65) Prior Publication Data
US 2020/0363613 A1    Nov. 19, 2020

(30) Foreign Application Priority Data

Aug. 8, 2017    (JP) .............................. JP2017-153367

(51) Int. Cl.
*G02B 9/62* (2006.01)
*G02B 13/18* (2006.01)
(Continued)

(52) U.S. Cl.
CPC .............. *G02B 13/18* (2013.01); *G02B 9/62* (2013.01); *G02B 13/04* (2013.01); *G02B 3/02* (2013.01); *G02B 3/04* (2013.01); *G02B 5/005* (2013.01)

(58) Field of Classification Search
CPC .......... G02B 13/18; G02B 9/62; G02B 13/04; G02B 5/005; G02B 3/02; G02B 3/04
(Continued)

(56) References Cited

U.S. PATENT DOCUMENTS 9,557,534 B1    1/2017 Liao et al.
9,715,088 B1    7/2017 Yang
(Continued)

FOREIGN PATENT DOCUMENTS

JP    2003-270530    9/2003
JP    2004-354572    12/2004
(Continued)

OTHER PUBLICATIONS

International Search Report dated Oct. 30, 2018 in corresponding International Application No. PCT/JP2018/028173.

*Primary Examiner* — Evelyn A Lester
(74) *Attorney, Agent, or Firm* — Wenderoth, Lind & Ponack L.L.P.

(57) ABSTRACT

A fixed-focus lens system includes, in order from an object side to an image side, a first lens element having negative power, the first lens element having a convex surface opposite to an object, a second lens element having positive power, the second lens element having a concave surface opposite to the object, a third lens element having positive power, a fourth lens element having negative power, and a fifth lens element having positive power. A half angle of view of the fixed-focus lens system is 50 degrees or more, and a shape of the convex surface on the object side of the first lens element has at least one inflection point at a part except for the optical axis. With this configuration, a fixed-focus lens system capable of favorably correcting various aberrations can be provided.

14 Claims, 8 Drawing Sheets

(51) Int. Cl.
   *G02B 13/04* (2006.01)
   *G02B 5/00* (2006.01)
   *G02B 3/02* (2006.01)
   *G02B 3/04* (2006.01)

(58) Field of Classification Search
   USPC .............................. 359/713, 740, 752, 761
   See application file for complete search history.

(56) References Cited

U.S. PATENT DOCUMENTS

| | | | |
|---|---|---|---|
| 10,175,461 B1* | 1/2019 | Lai | G02B 13/06 |
| 11,215,791 B2* | 1/2022 | Yuza | G02B 7/021 |
| 2003/0174410 A1 | 9/2003 | Noda | |
| 2004/0257677 A1 | 12/2004 | Matsusaka | |
| 2006/0103946 A1 | 5/2006 | Nagai et al. | |
| 2008/0266670 A1* | 10/2008 | Liao | G02B 13/004 359/654 |
| 2011/0176049 A1 | 7/2011 | Hsieh et al. | |
| 2013/0107376 A1 | 5/2013 | Tsai et al. | |
| 2015/0268446 A1 | 9/2015 | Chen et al. | |
| 2015/0346461 A1* | 12/2015 | Chen | H04N 5/2252 359/713 |
| 2016/0124183 A1 | 5/2016 | Hsu et al. | |
| 2016/0147044 A1* | 5/2016 | Kondo | G02B 13/0045 359/761 |
| 2016/0216486 A1* | 7/2016 | Tanaka | G02B 9/62 |
| 2017/0045713 A1 | 2/2017 | Chen et al. | |
| 2017/0153448 A1 | 6/2017 | Mori | |
| 2017/0153449 A1 | 6/2017 | Mori | |
| 2017/0269334 A1 | 9/2017 | Usui et al. | |
| 2018/0364452 A1 | 12/2018 | Usui et al. | |

FOREIGN PATENT DOCUMENTS

| | | |
|---|---|---|
| JP | 2005-10521 | 1/2005 |
| JP | 2006-145762 | 6/2006 |
| JP | 2009-145839 | 7/2009 |
| JP | 2015-18086 | 1/2015 |
| JP | 2017-102182 | 6/2017 |
| JP | 2017-102183 | 6/2017 |
| JP | 2017-173807 | 9/2017 |

* cited by examiner

SINGLE-FOCUS LENS SYSTEM AND CAMERA

This application is a U.S. National Phase Application of PCT International Application PCT/JP2018/028173.

TECHNICAL FIELD

The present disclosure relates to a fixed-focus lens system and a camera.

BACKGROUND ART

PTL 1 discloses a wide-angle small imaging lens that includes, in order from an object side to an image side, a first lens having negative power, a second lens having positive power, a third lens having positive power, a fourth lens having negative power, and a fifth lens having power.

CITATION LIST

Patent Literature

PTL 1: Unexamined Japanese Patent Publication No. 2015-18086

SUMMARY OF THE INVENTION

A fixed-focus lens system according to the present disclosure includes, in order from an object side to an image side, a first lens element having negative power, the first lens element having a convex surface opposite to an object, a second lens element having positive power, the second lens element having a concave surface opposite to the object, a third lens element having positive power, a fourth lens element having negative power, and a fifth lens element having positive power. A half angle of view of the fixed-focus lens system is 50 degrees or more, and a shape of the convex surface on the object side of the first lens element has at least one inflection point at a part except for an optical axis.

A camera according to the present disclosure includes the fixed-focus lens system and an imaging device to image light converged by the fixed-focus lens system. The fixed-focus lens system includes, in order from the object side to the image side, the first lens element having negative power, the first lens element having a convex surface opposite to the object, the second lens element having negative power, the second lens element having a concave surface opposite to the object, the third lens element having positive power, the fourth lens element having negative power, and the fifth lens element having positive power. A half angle of view of the fixed-focus lens system is 50 degrees or more, and a shape of the convex surface on the object side of the first lens element has at least one inflection point at a part except for an optical axis.

The present disclosure can provide a fixed-focus lens system that is bright and can favorably correct various aberrations, and a camera.

DESCRIPTION OF EMBODIMENTS

Hereinafter, exemplary embodiments will be described in detail with reference to the drawings. However, unnecessarily detailed descriptions may be omitted. For example, a detailed description of a well-known matter and a duplicated description of substantially the same configuration will be omitted in some cases. This is to avoid unnecessary redundancy in the following description, and to facilitate understanding by those skilled in the art.

Note that the present inventor will provide the accompanying drawings and the following description for those skilled in the art to sufficiently understand the present disclosure, and does not intend to limit the subject matter described in the claims.

First to Fifth Exemplary Embodiments: Fixed-Focus Lens System

FIG. 1, FIG. 3, FIG. 5, FIG. 7, and FIG. 9 are lens arrangement diagrams of fixed-focus lens systems according to first to fifth exemplary embodiments.

In each diagram, an asterisk "*" attached to a certain surface shows that the surface is aspherical. Further, the straight line drawn on the rightmost side of each drawing represents a position of image surface S, and parallel plate P is provided on an object side of image surface S. Note that an aspect ratio is identical in those diagrams.

First Exemplary Embodiment

The fixed-focus lens system according to the first exemplary embodiment will be described below with reference to FIG. 1.

Figure 1:
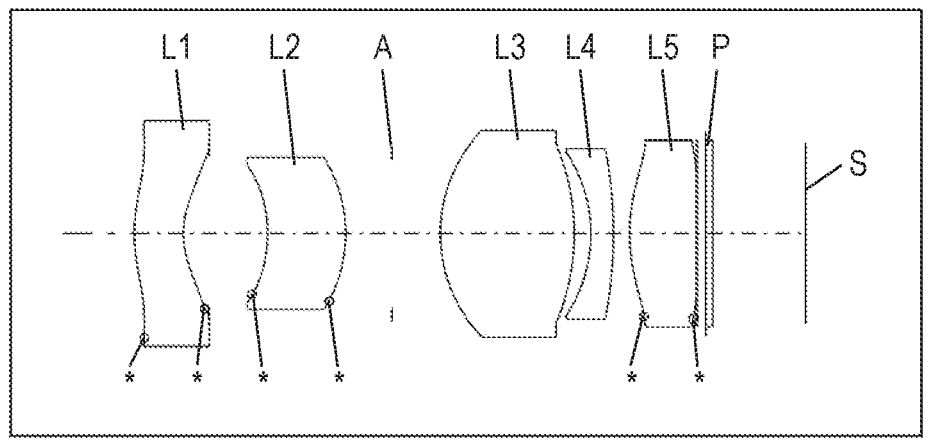
FIG. 1 is a lens arrangement diagram illustrating an infinity focusing state of a fixed-focus lens system according to a first exemplary embodiment.
Figure 2:
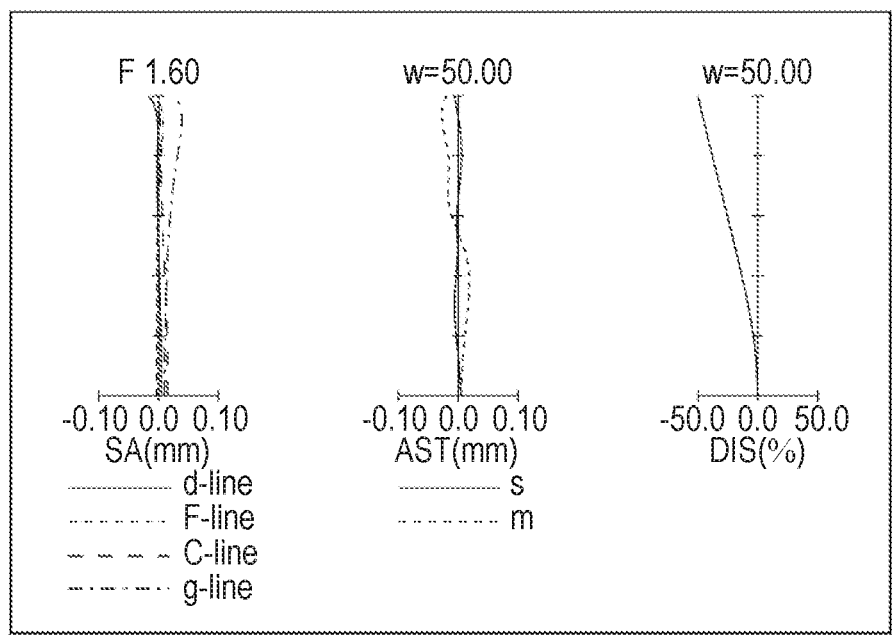
FIG. 2 is a view illustrating a longitudinal aberration in an infinity focusing state of a fixed-focus lens system according to a first numerical example of the first exemplary embodiment.

FIG. 1 is a lens arrangement diagram of the fixed-focus lens system according to the first exemplary embodiment.

The fixed-focus lens system according to the first exemplary embodiment includes, in order from an object side to an image side, first lens element L1 having negative power, second lens element L2 having positive power, aperture diaphragm A, third lens element L3 having positive power, fourth lens element L4 having negative power, fifth lens element L5 having positive power, and parallel plate P, for example. Note that the object side corresponds to a side of first lens element L1, and the image side corresponds to a side of image surface S.

Each lens element will be described below.

First lens element L1 is a meniscus lens made of glass, having a convex surface on the object side. First lens element L1 includes both surfaces aligned along an optical axis direction, each of the both surfaces having an aspherical shape. The surface on the object side of first lens element L1 is convex at a part near an optical axis. Further, the surface on the object side of first lens element L1 has the aspherical shape having at least one inflection point at a part except for the optical axis. This configuration causes the surface on the object side of first lens element L1 to decrease power toward the part except for the optical axis.

Second lens element L2 is a meniscus lens made of glass, having a convex surface on the image side. Second lens element L2 includes both surfaces aligned along the optical axis direction, each of the both surfaces having an aspherical shape.

Third lens element L3 is a biconvex lens made of glass.

Fourth lens element L4 is a meniscus lens made of glass, having a convex surface on the image side.

Fifth lens element L5 is a meniscus lens made of glass, having a convex surface on the object side. Fifth lens element L5 includes both surfaces aligned along the optical axis direction, each of the both surfaces having an aspherical shape.

The fixed-focus lens system according to the first exemplary embodiment is thus configured.

Second Exemplary Embodiment

The fixed-focus lens system according to the second exemplary embodiment will be described below with reference to FIG. 3.

Figure 3:
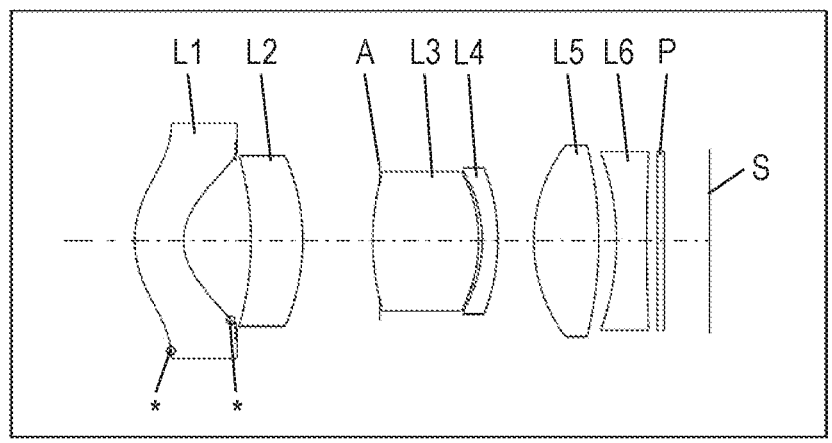
FIG. 3 is a lens arrangement diagram illustrating an infinity focusing state of a fixed-focus lens system according to a second exemplary embodiment.
Figure 4:
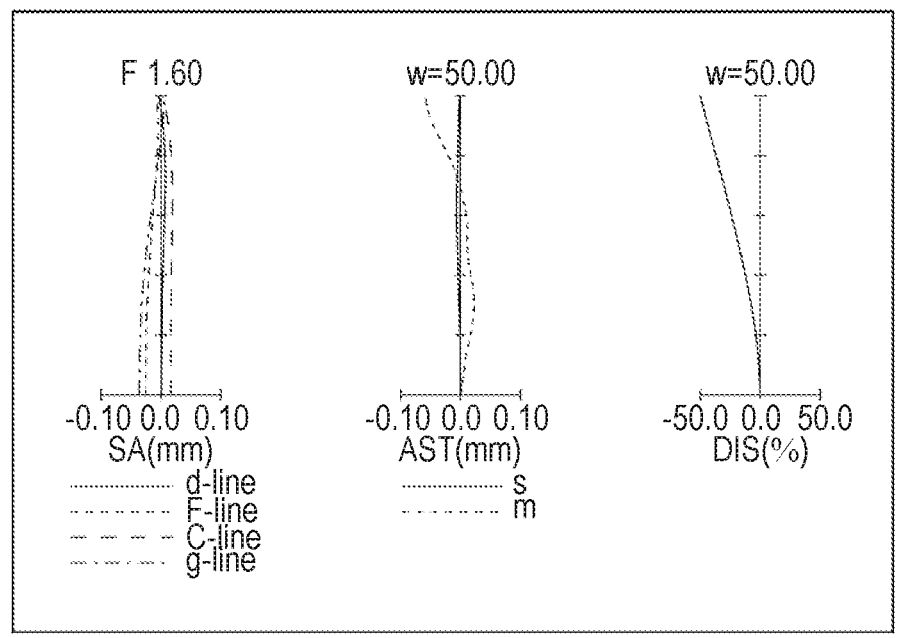
FIG. 4 is a view illustrating a longitudinal aberration in an infinity focusing state of a fixed-focus lens system according to a second numerical example of the second exemplary embodiment.

FIG. 3 is a lens arrangement diagram of the fixed-focus lens system according to the second exemplary embodiment.

The fixed-focus lens system according to the second exemplary embodiment includes, in order from an object side to an image side, first lens element L1 having negative power, second lens element L2 having positive power, aperture diaphragm A, third lens element L3 having positive power, fourth lens element L4 having negative power, fifth lens element L5 having positive power, sixth lens element L6 having negative power, and parallel plate P, for example.

Each lens element will be described below.

First lens element L1 is a meniscus lens made of glass, having a convex surface on the object side. First lens element L1 includes both surfaces aligned along an optical axis direction, each of the both surfaces having an aspherical shape. The surface on the object side of first lens element L1 is convex at a part near an optical axis. Further, the surface on the object side of first lens element L1 has the aspherical shape having at least one inflection point at a part except for the optical axis. This configuration causes the surface on the object side of first lens element L1 to decrease power toward the part except for the optical axis.

Second lens element L2 is a meniscus lens made of glass, having a convex surface on the image side.

Third lens element L3 is a biconvex lens made of glass.

Fourth lens element L4 is a meniscus lens made of glass, having a convex surface on the image side.

Fifth lens element L5 is a biconvex lens made of glass.

Sixth lens element L6 is a biconcave lens made of glass.

The fixed-focus lens system according to the second exemplary embodiment is thus configured.

Third Exemplary Embodiment

The fixed-focus lens system according to the third exemplary embodiment will be described below with reference to FIG. 5.

Figure 5:
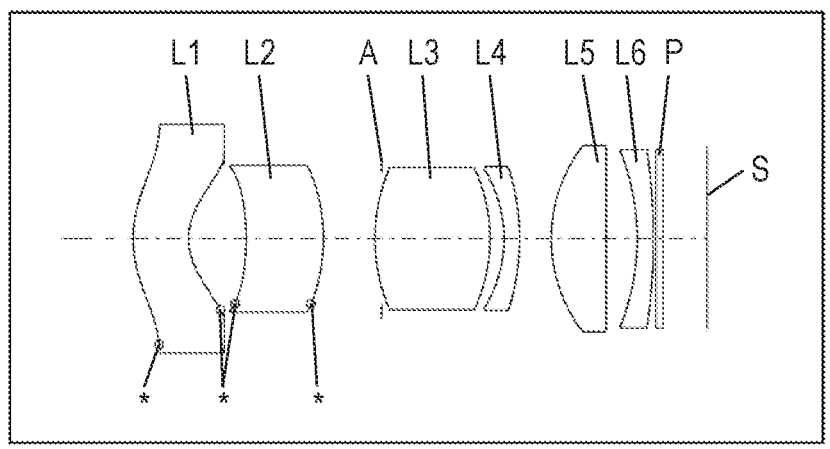
FIG. 5 is a lens arrangement diagram in an infinity focusing state of a fixed-focus lens system according to a third exemplary embodiment.
Figure 6:
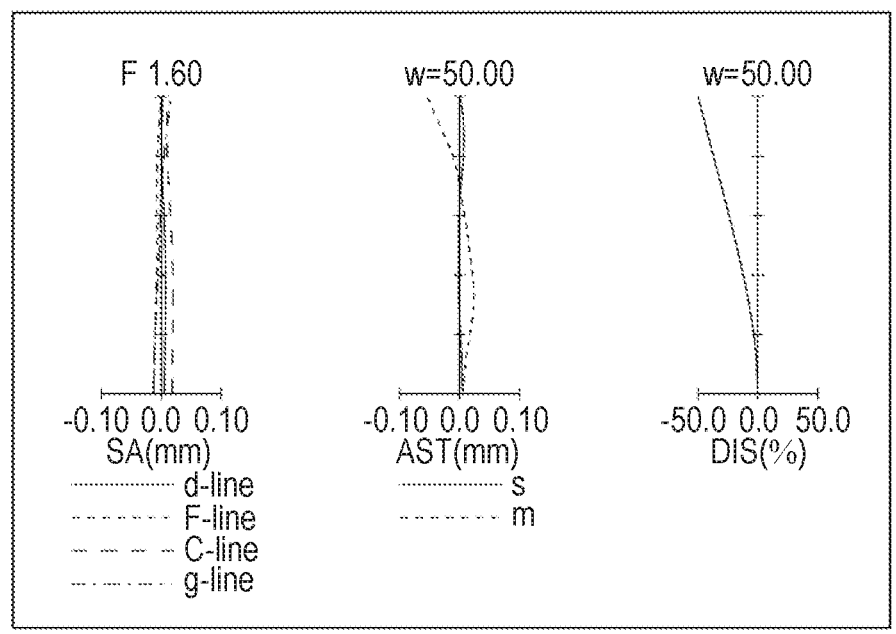
FIG. 6 is a view illustrating a longitudinal aberration in an infinity focusing state of a fixed-focus lens system according to a third numerical example of the third exemplary embodiment.

FIG. 5 is a lens arrangement diagram of the fixed-focus lens system according to the third exemplary embodiment.

The fixed-focus lens system according to the third exemplary embodiment includes, in order from an object side to an image side, first lens element L1 having negative power, second lens element L2 having positive power, aperture diaphragm A, third lens element L3 having positive power, fourth lens element L4 having negative power, fifth lens element L5 having positive power, sixth lens element L6 having negative power, and parallel plate P, for example.

Each lens element will be described below.

First lens element L1 is a meniscus lens made of glass, having a convex surface on the object side. First lens element L1 includes both surfaces aligned along an optical axis direction, each of the both surfaces having an aspherical shape. Further, the surface on the object side of first lens element L1 is a convex surface at a part near the optical axis, and its power decreases toward a part except for the optical axis. This surface has an aspherical shape having at least one inflection point at the part except for the optical axis.

Second lens element L2 is a meniscus lens made of glass, having a convex surface on the image side. Second lens element L2 includes both surfaces aligned along the optical axis direction, each of the both surfaces having an aspherical shape.

Third lens element L3 is a biconvex lens made of glass.

Fourth lens element L4 is a meniscus lens made of glass, having a convex surface on the image side.

Fifth lens element L5 is a meniscus lens made of glass, having a convex surface on the object side.

Sixth lens element L6 is a meniscus lens made of glass, having a convex surface on the image side.

The fixed-focus lens system according to the third exemplary embodiment is thus configured.

Fourth Exemplary Embodiment

The fixed-focus lens system according to the fourth exemplary embodiment will be described below with reference to FIG. 7.

Figure 7:
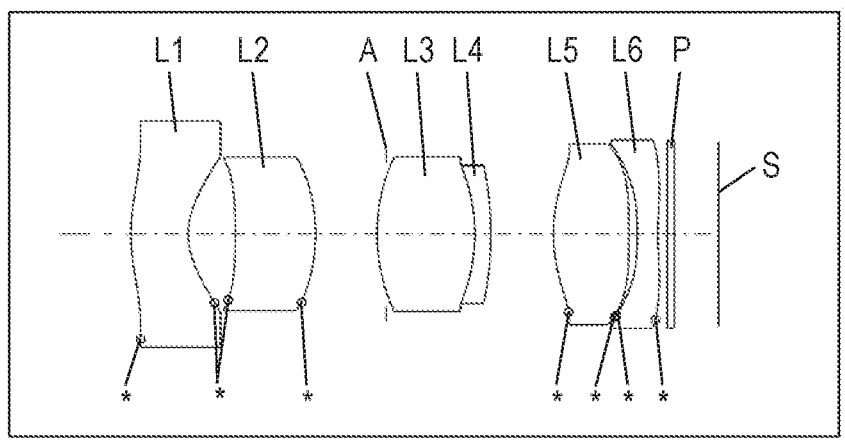
FIG. 7 is a lens arrangement diagram illustrating an infinity focusing state of a fixed-focus lens system according to a fourth exemplary embodiment.
Figure 8:
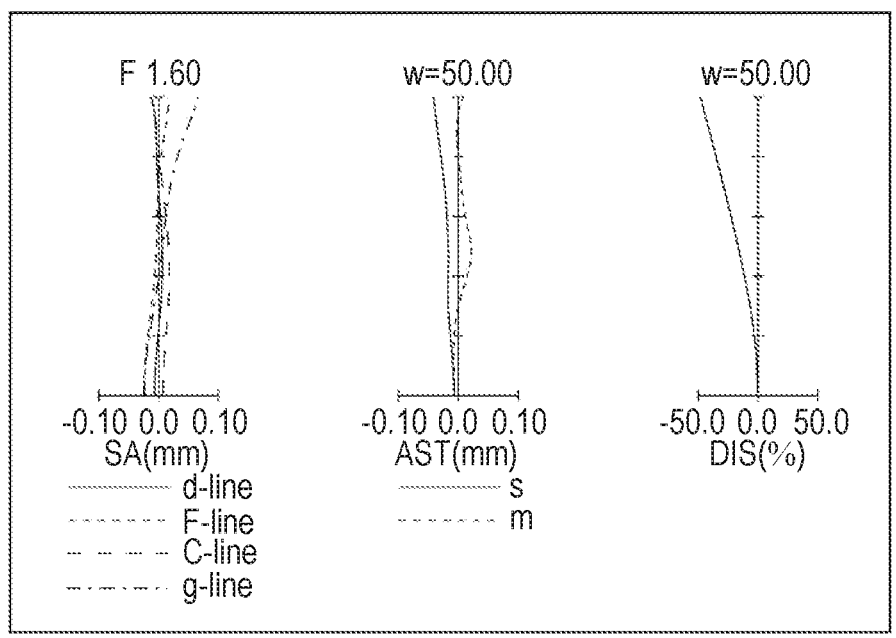
FIG. 8 is a view illustrating a longitudinal aberration in an infinity focusing state of a fixed-focus lens system according to a fourth numerical example of the fourth exemplary embodiment.

FIG. 7 is a lens arrangement diagram of the fixed-focus lens system according to the fourth exemplary embodiment.

The fixed-focus lens system according to the fourth exemplary embodiment includes, in order from an object side to an image side, first lens element L1 having negative power, second lens element L2 having positive power, aperture diaphragm A, third lens element L3 having positive power, fourth lens element L4 having negative power, fifth lens element L5 having positive power, sixth lens element L6 having negative power, and parallel plate P, for example.

Each lens element will be described below.

First lens element L1 is a meniscus lens made of glass, having a convex surface on the object side. First lens element L1 includes both surfaces aligned along an optical axis direction, each of the both surfaces having an aspherical shape. Further, the surface on the object side of first lens element L1 is a convex surface at a part near the optical axis, and its power decreases toward a part except for the optical axis. This surface has an aspherical shape having at least one inflection point at the part except for the optical axis.

Second lens element L2 is a meniscus lens made of glass, having a convex surface on the image side. Second lens element L2 includes both surfaces aligned along the optical axis direction, each of the both surfaces having an aspherical shape.

Third lens element L3 is a biconvex lens made of glass.

Fourth lens element L4 is a meniscus lens made of glass, having a convex surface on the image side.

Fifth lens element L5 is a biconvex lens made of glass. Fifth lens element L5 includes both surfaces aligned along the optical axis direction, each of the both surfaces having an aspherical shape.

Sixth lens element L6 is a biconcave lens made of glass. Sixth lens element L6 includes both surfaces aligned along the optical axis direction, each of the both surfaces having an aspherical shape. Further, the surface on the image side of sixth lens element L6 is a concave surface at a part near the optical axis, and its power decreases toward a part except for the optical axis. This surface has an aspherical shape having at least one inflection point at the part except for the optical axis.

The fixed-focus lens system according to the fourth exemplary embodiment is thus configured.

Fifth Exemplary Embodiment

The fixed-focus lens system according to the fifth exemplary embodiment will be described below with reference to FIG. 9.

Figure 9:
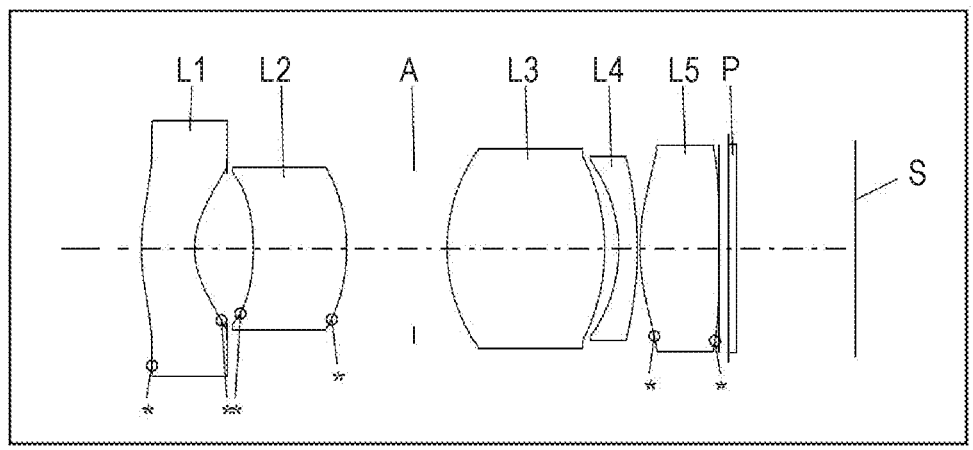
FIG. 9 is a lens arrangement diagram illustrating an infinity focusing state of a fixed-focus lens system according to a fifth exemplary embodiment.
Figure 10:
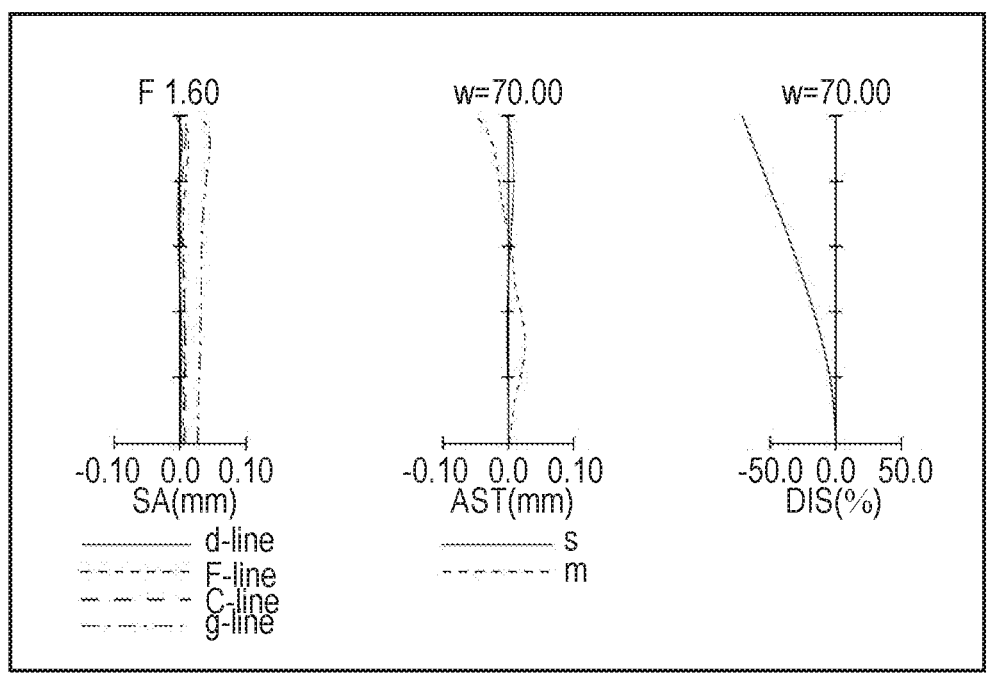
FIG. 10 is a view illustrating a longitudinal aberration in an infinity focusing state of a fixed-focus lens system according to a fifth numerical example of the fifth exemplary embodiment.

FIG. 9 is a lens arrangement diagram of the fixed-focus lens system according to the fifth exemplary embodiment.

The fixed-focus lens system according to the fifth exemplary embodiment includes, in order from an object side to an image side, first lens element L1 having negative power, second lens element L2 having positive power, aperture diaphragm A, third lens element L3 having positive power, fourth lens element L4 having negative power, fifth lens element L5 having positive power, and parallel plate P, for example.

Each lens element will be described below.

First lens element L1 is a meniscus lens made of glass, having a convex surface on the object side. First lens element L1 includes both surfaces aligned along an optical axis direction, each of the both surfaces having an aspherical shape. Further, the surface on the object side of first lens element L1 is a convex surface at a part near the optical axis, and its power decreases toward a part except for the optical axis. This surface has an aspherical shape having at least one inflection point at the part except for the optical axis.

Second lens element L2 is a meniscus lens made of glass, having a convex surface on the image side. Second lens element L2 includes both surfaces aligned along the optical axis direction, each of the both surfaces having an aspherical shape.

Third lens element L3 is a biconvex lens made of glass.

Fourth lens element L4 is a meniscus lens made of glass, having a convex surface on the image side.

Fifth lens element L5 is a meniscus lens made of glass, having a convex surface on the object side. Fifth lens element L5 includes both surfaces aligned along the optical axis direction, each of the both surfaces having an aspherical shape.

The fixed-focus lens system according to the fifth exemplary embodiment is thus configured.

(Conditions and Effects)

Beneficial conditions for satisfying the configurations of the fixed-focus lens systems of the first to fifth exemplary embodiments will be described below.

A plurality of beneficial conditions are defined to the fixed-focus lens system of each exemplary embodiment. In this case, a configuration of the fixed-focus lens system that satisfies all the conditions is most effective.

Alternatively, by satisfying an individual condition as follows, a fixed-focus lens system exhibiting an effect corresponding to this condition can be obtained.

The fixed-focus lens system according to any one of the first to fifth exemplary embodiment includes, in order from the object side to the image side, first lens element L1 having negative power, the first lens element having a convex surface opposite to an object, second lens element L2 having positive power, the second lens element having a concave surface opposite to the object, third lens element L3 having a biconvex shape to have positive power, fourth lens element L4 having negative power, directing a concave surface opposite to the object, and fifth lens element L5 having positive power, the fifth lens element having a convex surface opposite to the object, for example.

Further, a shape of the convex surface on the object side of first lens element L1 has at least one inflection point at a part except for the optical axis, and a half angle of view of the fixed-focus lens system is 50 degrees or more.

This configuration can favorably correct astigmatism at a peripheral part of an imaging region while favorably correcting a spherical aberration at a central part of the imaging region. This configuration can provide a fixed-focus lens system that is bright and can favorably correct various aberrations.

Hereinafter, the above-described lens configuration is used as a basic configuration of each exemplary embodiment.

A fixed-focus lens system having the basic configuration desirably satisfies, for example, a condition (1) shown below.

$$1.7 < (L1R1 + L1R2)/(L1R1 - L1R2) < 5.0 \qquad (1)$$

Herein, L1R1 is a radius of curvature of a surface on an object side of first lens element L1, and L1R2 is a radius of curvature of a surface on an image side of first lens element L1.

In other words, the condition (1) defines a shape factor of first lens element L1.

When the shape factor is less than or equal to a lower limit value (1.7) of the condition (1), the radius of curvature of the surface on the object side of first lens element L1 becomes relatively excessively large relative to the radius of curvature of the surface on the image side. This configuration therefore causes the fixed-focus lens system not to favorably correct the spherical aberration of a ray passing around the part near the optical axis, thereby deteriorating resolution performance.

When the shape factor is more than or equal to an upper limit value (5.0) of the condition (1), the radius of curvature of the surface on the object side of first lens element L1 becomes relatively excessively small relative to the radius of curvature of the surface on the image side. This therefore increases a manufacturing difficulty level of first lens element L1 in the fixed-focus lens system. Hence cost of the fixed-focus lens system is increased.

At this time, within a range of the condition (1), it is more preferable to satisfy any one of the following conditions (1a) and (1b), or both the following conditions (1a) and (1b).

$$2.0 < (L1R1+L1R2)/(L1R1-L1R2) \tag{1a}$$

$$(L1R1+L1R2)/(L1R1-L1R2) < 4.0 \tag{1b}$$

This further improves the above-described effects.

Further, within the range of the condition (1), it is more preferable to satisfy any one of the following conditions (1c) and (1d), or both the following conditions (1c) and (1d).

$$2.2 \leq (L1R1+L1R2)/(L1R1-L1R2) \tag{1c}$$

$$(L1R1+L1R2)/(L1R1-L1R2) < 3.6 \tag{1d}$$

This further improves the above-described effects.

The fixed-focus lens system having the basic configuration in the present disclosure desirably satisfies, for example, a condition (2) shown below.

$$2.1 < f2/f < 10.0 \tag{2}$$

Herein, f2 is a focal length of second lens element L2 at a d-line, and f is a focal length of an entire system at the d-line.

In other words, the condition (2) defines a ratio of the focal length of second lens element L2 at the d-line to the focal length of the entire system configuring the fixed-focus lens system having the basic configuration at the d-line.

When f2/f is less than or equal to a lower limit value (2.1) of the condition (2), the positive power of second lens element L2 becomes excessively strong.

Therefore, various aberrations, particularly, a coma aberration of off-axis luminous flux increases in the fixed-focus lens system, thereby deteriorating resolution performance.

When f2/f is more than or equal to an upper limit value (10.0) of the condition (2), the positive power of second lens element L2 becomes excessively weak. This configuration therefore causes the fixed-focus lens system not to favorably correct the various aberrations, particularly, a spherical aberration of a ray passing around the part near the optical axis. This deteriorates resolution performance of the fixed-focus lens system.

At this time, within a range of the condition (2), it is more preferable to satisfy any one of the following conditions (2a) and (2b), or both the following conditions (2a) and (2b).

$$2.3 < f2/f \tag{2a}$$

$$f2/f < 8.0 \tag{2b}$$

This further improves the above-described effects.

Further, within the range of the condition (2), it is more preferable to satisfy any one of the following conditions (2c) and (2d), or both the following conditions (2c) and (2d).

$$2.5 < f2/f \tag{2c}$$

$$f2/f < 7.5 \tag{2d}$$

This further improves the above-described effects.

The fixed-focus lens system having the basic configuration in the present disclosure desirably satisfies, for example, a condition (3) shown below.

$$-5.0 < f4/f < -1.0 \tag{3}$$

Herein, f4 is a focal length of fourth lens element L4 at the d-line, and f is the focal length of the entire system at the d-line.

In other words, the condition (3) defines a ratio of the focal length of fourth lens element L4 at the d-line to the focal length of the entire system configuring the fixed-focus lens system having the basic configuration at the d-line.

When f4/f is less than or equal to a lower limit value (−5.0) of the condition (3), the negative power of fourth lens element L4 becomes excessively weak. This configuration therefore causes the fixed-focus lens system not to favorably correct the various aberrations, particularly, a spherical aberration of a ray passing around the part near the optical axis. This deteriorates the resolution performance of the fixed-focus lens system.

When f4/f is more than or equal to an upper limit value (−1.0) of the condition (3), the negative power of fourth lens element L4 becomes excessively strong. Therefore, the various aberrations, particularly, astigmatism of the off-axis luminous flux increases in the fixed-focus lens system, thereby deteriorating the resolution performance.

At this time, within a range of the condition (3), it is more preferable to satisfy any one of the following conditions (3a) and (3b), or both the following conditions (3a) and (3b).

$$-4.0 < f4/f \tag{3a}$$

$$f4/f < -1.3 \tag{3b}$$

Further, within the range of the condition (3), it is more preferable to satisfy any one of the following conditions (3c) and (3d), or both the following conditions (3c) and (3d).

$$-3.7 < f4/f \tag{3c}$$

$$f4/f < -1.6 \tag{3b}$$

This further improves the above-described effects.

The fixed-focus lens system having the basic configuration in the present disclosure desirably satisfies, for example, a condition (4) shown below.

$$1.0 < f5/f < 5.0 \tag{4}$$

Herein, f5 is a focal length of fifth lens element L5 at the d-line, and f is the focal length of the entire system at the d-line.

In other words, the condition (4) defines a ratio of the focal length of fifth lens element L5 at the d-line to the focal length of the entire system configuring the fixed-focus lens system having the basic configuration at the d-line.

When f5/f is less than or equal to a lower limit value (1.0) of the condition (4), the positive power of fifth lens element L5 becomes excessively strong. Therefore, the various aberrations, particularly, the coma aberration of the off-axis luminous flux increases in the fixed-focus lens system, thereby deteriorating the resolution performance.

When f5/f is more than or equal to an upper limit value (5.0) of the condition (4), the positive power of fifth lens element L5 becomes excessively weak. This configuration therefore causes the fixed-focus lens system not to favorably correct the various aberrations, particularly, the spherical aberration of the ray passing around the part near the optical axis. This deteriorates the resolution performance of the fixed-focus lens system.

At this time, within a range of the condition (4), it is more preferable to satisfy any one of the following conditions (4a) and (4b), or both the following conditions (4a) and (4b).

$$1.3 < f5/f \quad (4a)$$

$$f5/f < 3.5 \quad (4b)$$

This further improves the above-described effects.

Further, within the range of the condition (4), it is more preferable to satisfy any one of the following conditions (4c) and (4d), or both the following conditions (4c) and (4d).

$$1.5 < f5/f \quad (4c)$$

$$f5/f < 2.5 \quad (4d)$$

This further improves the above-described effects.

It is desirable that the fixed-focus lens system having the basic configuration in the present disclosure simultaneously satisfies, for example, a condition (5) and a condition (6) shown below.

$$1.6 < nL1 \quad (5)$$

$$30 < vL1 \quad (6)$$

Herein, nL1 is a refraction factor of first lens element L1 at the d-line, and vL1 is an Abbe number of first lens element L1.

In other words, the condition (5) defines the refraction factor of first lens element L1 at the d-line. The condition (6) is a condition for defining the Abbe number of first lens element L1.

When nL1 is less than or equal to a lower limit value (1.6) of the condition (5), the radius of curvature of the surface on the image side of first lens element L1 becomes excessively small. Therefore, the various aberrations, particularly, the astigmatism of the off-axis luminous flux increases in the fixed-focus lens system, thereby deteriorating the resolution performance.

When vL1 is less than or equal to a lower limit value (30) of the condition (6), the various aberrations, particularly, a chromatic aberration of magnification increases in the fixed-focus lens system, thereby deteriorating the resolution performance.

At this time, it is more preferable to satisfy any one of the following conditions (5a) and (6a), or both the following conditions (5a) and (6a).

$$1.7 < nL1 \quad (5a)$$

$$35 < vL1 \quad (6a)$$

This further improves the above-described effects.

Further, it is more preferable to satisfy any one of the following conditions (5b) and (6b), or both the following conditions (5b) and (6b).

$$1.8 < nL1 \quad (5b)$$

$$40 < vL1 \quad (6b)$$

This further improves the above-described effects.

The fixed-focus lens system having the basic configuration in the present disclosure desirably satisfies, for example, a condition (7) shown below.

$$0.15 < f/TTL < 0.30 \quad (7)$$

Herein, f is the focal length of the entire system at the d-line, and TTL is an entire optical length of a fixed-focus lens system.

In other words, the condition (7) defines a ratio of the focal length of the entire system configuring the fixed-focus lens system having the basic configuration at the d-line to the entire optical length of the fixed-focus lens system having the basic configuration.

When f/TTL is less than or equal to a lower limit value (0.15) of the condition (7), the entire optical length of the fixed-focus lens system becomes excessively large. This increases the optical system in size.

When f/TTL is more than or equal to an upper limit value (0.30) of the condition (7), the entire optical length of the fixed-focus lens system becomes excessively small. This hinders favorable correction of the various aberrations, thereby deteriorating the resolution performance.

At this time, within a range of the condition (7), it is more preferable to satisfy any one of the following conditions (7a) and (7b), or both the following conditions (7a) and (7b).

$$0.18 < f/TTL \quad (7a)$$

$$f/TTL < 0.27 \quad (7b)$$

This further improves the above-described effects.

Further, within the range of the condition (7), it is more preferable to satisfy any one of the following conditions (7c) and (7d), or both the following conditions (7c) and (7d).

$$0.20 < f/TTL \quad (7c)$$

$$f/TTL < 0.25 \quad (7d)$$

This further improves the above-described effects.

In addition, it is desirable that the fixed-focus lens system having the basic configuration in the present disclosure further includes sixth lens element L6 having negative power. This can move a principal point position of the lens system toward the object. Hence a compact fixed-focus lens system can be provided.

The fixed-focus lens system having the basic configuration in the present disclosure further includes sixth lens element L6 having negative power. Further, it is desirable that a surface shape on the image side of sixth lens element L6 has at least one inflection point at the part except for the optical axis. This configuration can favorably correct the astigmatism at the peripheral part of the imaging region while favorably correcting the spherical aberration at the central part of the imaging region. This configuration can provide a fixed-focus lens system that is bright and can favorably correct the various aberrations.

Sixth Exemplary Embodiment: Camera

A camera according to a sixth exemplary embodiment, which has the fixed-focus lens system according to the first exemplary embodiment, will be described below with reference to FIG. 11 to FIG. 13. As the camera, an on-vehicle camera will be exemplified and described.

Note that the on-vehicle camera may include any one of the fixed-focus lens systems according to the second to fifth exemplary embodiments instead of the fixed-focus lens system according to the first exemplary embodiment.

Figure 11:
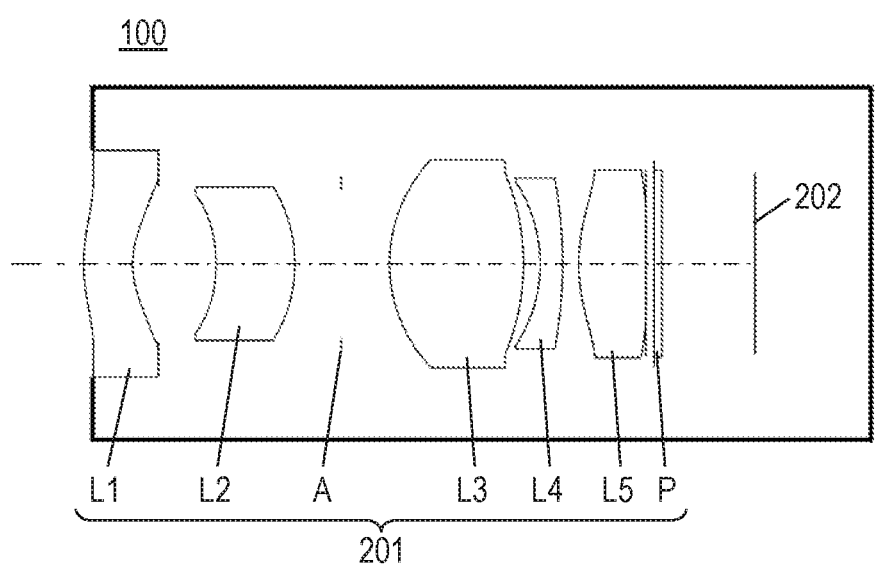
FIG. 11 is a schematic diagram of an on-vehicle camera equipped with the fixed-focus lens system according to the first exemplary embodiment.

FIG. 11 is a schematic configuration diagram of the on-vehicle camera according to the sixth exemplary embodiment, which has the fixed-focus lens system according to the first exemplary embodiment.

On-vehicle camera 100 includes, for example, fixed-focus lens system 201 and imaging device 202. Fixed-focus lens system 201 forms an optical image of an object. Imaging device 202 converts the optical image formed by fixed-focus lens system 201 into an electrical image signal.

Imaging device 202 is disposed at a position of image surface S in the fixed-focus lens system according to the first exemplary embodiment as illustrated in FIG. 1.

On-vehicle camera 100 having fixed-focus lens system 201 is thus configured.

Hereinafter, a configuration in which on-vehicle camera 100 described above is mounted on vehicle 500 such as an automobile will be described with reference to FIG. 12 and FIG. 13.

Figure 12:
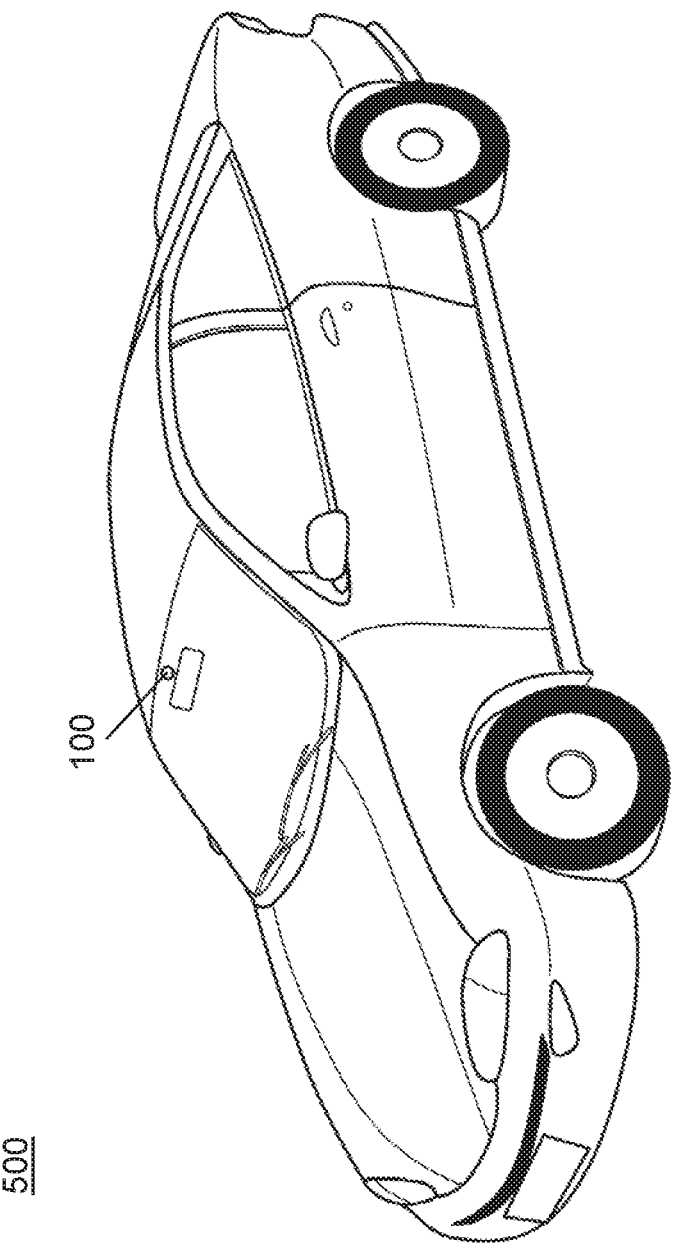
FIG. 12 is a schematic diagram of a vehicle equipped with the on-vehicle camera at a front position of the vehicle.
Figure 13:
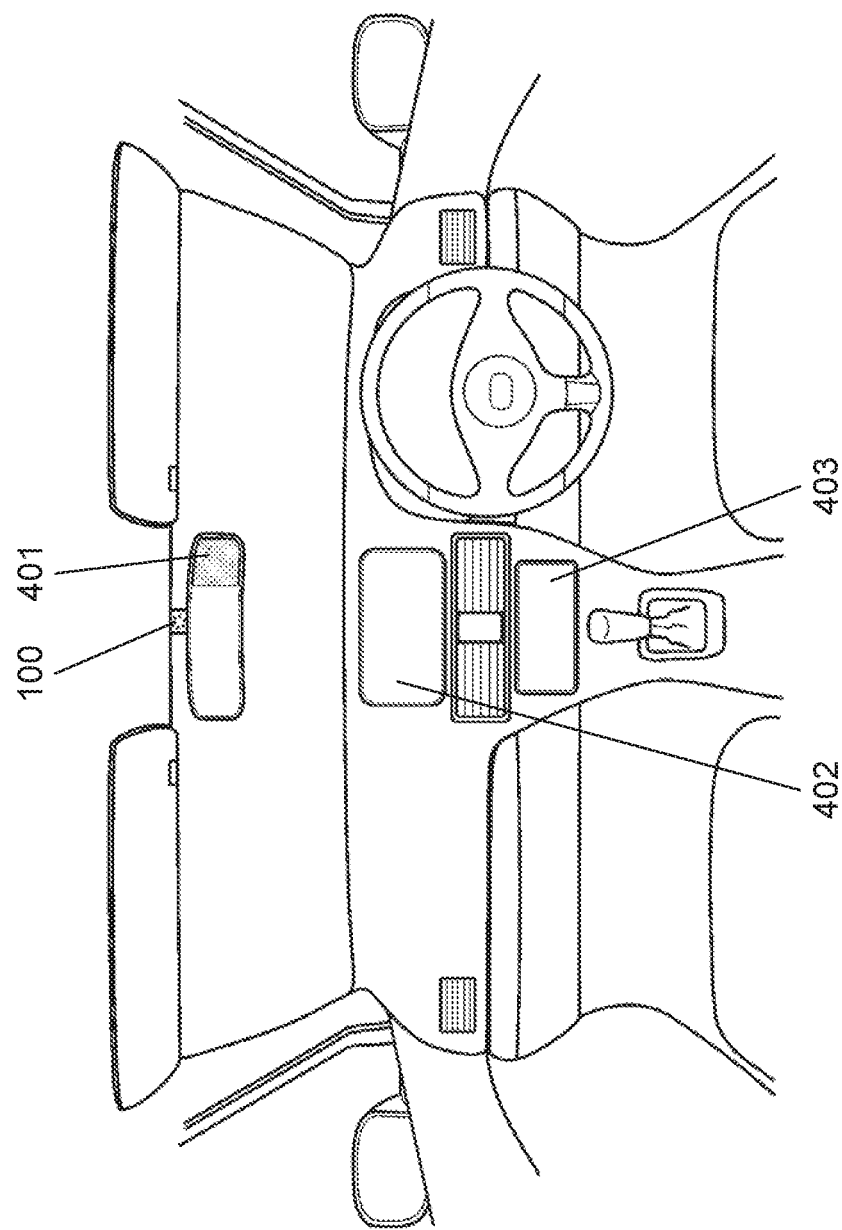
FIG. 13 is a schematic diagram viewing ahead from a cabin of the vehicle equipped with the on-vehicle camera at a front position of the cabin.

FIG. 12 is a schematic diagram of a vehicle equipped with on-vehicle camera 100 at a front position of a cabin of vehicle 500. FIG. 13 is a schematic diagram viewing ahead from the cabin of the vehicle equipped with on-vehicle camera 100 at the front position of the cabin of vehicle 500.

On-vehicle camera 100 is disposed near a rear-view mirror (not illustrated) inside vehicle 500. In other words, on-vehicle camera 100 is used as a sensing camera or a view camera.

Specifically, when on-vehicle camera 100 is used as the sensing camera, an image captured by the sensing camera is used to check an inter-vehicle distance to another vehicle and the like. When on-vehicle camera 100 is used as the view camera, an image captured by the view camera is displayed on a monitor in the cabin to allow a driver to check an area surrounding the vehicle such as ahead of the vehicle, behind the vehicle, and on a side of the vehicle.

An image signal acquired by imaging device 202 is, for example, displayed on display device 401, display device 402, or display device 403 disposed in the front part of the cabin of vehicle 500. The image signal is further stored as image data in a memory, for example.

Display device 401 is, for example, an electronic rear-view mirror. Display device 402 and display device 403 are, for example, display devices in a navigation system and a front panel.

This configuration can display an image of an area behind the vehicle on, for example, display device 401 or display device 402 of vehicle 500 using on-vehicle camera 100 including fixed-focus lens system 201. As a result, passengers including the driver can easily perform visual recognition of a situation of the rear of vehicle 500 via display device 401 or display device 402.

In other words, the fixed-focus lens system according to the present disclosure is effective for lens systems of both the sensing camera and the view camera.

The technique disclosed in the present application has been described above with the first to sixth exemplary embodiments as examples.

However, the technique in the present disclosure is not limited to the first to sixth exemplary embodiments, and can also be applied to exemplary embodiments in which changes, replacements, additions, omissions, and the like are made.

A lens element having substantially no power may be added as appropriate to any of the fixed-focus lens systems according to the first to fifth exemplary embodiments.

The lens elements having aspherical shapes in the fixed-focus lens systems according to the first to fifth exemplary embodiments may be formed by polishing or molding, for example. Further, the lens elements may be formed by a so-called replicated lens (a hybrid lens) in which an aspherical coating is formed on a surface of a spherical lens.

Note that in the sixth exemplary embodiment, a configuration in which any one of the fixed-focus lens systems according to the first to fifth exemplary embodiments is applied to the on-vehicle camera serving as the sensing camera or the view camera has been described as an example, but the present disclosure is not limited thereto. The fixed-focus lens system of the present disclosure may be applied to a camera mounted on a smartphone or a portable telephone, a surveillance camera in a surveillance system, and a web camera, for example. In this case, similar effects to the above-described effects can be obtained.

NUMERICAL EXAMPLES

First to fifth numerical examples specifically implemented in the configurations of the fixed-focus lens systems of the first to fifth exemplary embodiments will be described below with reference to FIGS. 2, 4, 6, 8, and 10.

Note that in the numerical examples, the lengths in the tables are all in the unit of "mm", and the angles of view are all in the unit of "°". Note that the expression "angle of view" indicated in the tables represents a diagonal half angle of view. In the numerical examples, r is a radius of curvature, d is an interplanar spacing, nd is a refractive index at the d-line, and vd (also written as νd) is an Abbe number at the d-line. Further, in the numerical examples, the surfaces marked with * are aspherical. The aspherical shape is defined by the following mathematical formula.

$$Z = \frac{h^2/r}{1+\sqrt{1-(1+\kappa)(h/r)^2}} + \sum A_n h^n \quad \text{[Mathematical Formula 1]}$$

Herein, Z is a distance from a point on the aspherical surface having height h from the optical axis to a tangential plane at a peak of the aspherical surface, h is a height from the optical axis, r is a radius of curvature at the peak, K is a conic constant, and $A_n$ is an aspherical coefficient of n-th order.

FIGS. 2, 4, 6, 8, and 10 are longitudinal aberration diagrams of fixed-focus lens systems in the infinity focusing state according to the first to fifth numerical examples corresponding to the first to fifth exemplary embodiments, respectively.

In each longitudinal aberration diagram, spherical aberration (SA) (mm), astigmatism (AST) (mm), and distortion (DIS) (%) are illustrated in order from the top.

In the view of the SA, a vertical axis indicates an F number (denoted by "F"), a solid line indicates a characteristic for a d-line, a short broken line indicates a characteristic for an F-line, and a long broken line indicates a characteristic for a C-line.

In the view of the AST, the vertical axis indicates an imaged height, the solid line indicates a characteristic with respect to a sagittal plane (denoted by "s"), and the broken line indicates a characteristic with respect to a meridional plane (denoted by "m"). Note that, w represents a half angle of view.

In the view of the DIS, the vertical axis indicates an imaged height, and w represents a half angle of view.

Here, the solid line of distortion shows an aberration, assuming Y=f·tan(ω) as the ideal imaged height (Y is an imaged height, and f is a focal length of the entire system).

First Numerical Example

The first numerical example of the fixed-focus lens system corresponding to the first exemplary embodiment in FIG. 1 will be described below. Specifically, as the first numerical example of the fixed-focus lens system, surface data is indicated in (Table 1), aspherical data is indicated in (Table 2), various pieces of data are indicated in (Table 3), and fixed lens data is indicated in (Table 4).

TABLE 1

Surface data

| Surface number | r | d | nd | vd |
|---|---|---|---|---|
| Object surface | ∞ | | | |
| 1* | 6.99840 | 2.04730 | 1.80998 | 40.9 |
| 2* | 3.54910 | 3.48910 | | |
| 3* | −6.17170 | 3.26590 | 1.68948 | 31.0 |
| 4* | −6.24680 | 1.93330 | | |
| 5 (Diaphragm) | ∞ | 2.02400 | | |
| 6 | 6.33030 | 5.59880 | 1.61800 | 63.4 |
| 7 | −9.73810 | 0.69580 | | |
| 8 | −6.27040 | 0.93860 | 1.94595 | 18.0 |
| 9 | −19.50400 | 0.67840 | | |
| 10* | 7.55950 | 2.79940 | 1.55332 | 71.7 |
| 11* | 120.28160 | 0.00000 | | |
| 12 | ∞ | 0.35000 | | |
| 13 | ∞ | 0.30000 | 1.51680 | 64.2 |
| 14 | ∞ | 3.88330 | | |
| 15 | ∞ | BF | | |
| Image surface | ∞ | | | |

TABLE 2

Aspherical data

First surface

K = −2.07482E+00, A4 = −2.59349E−03, A6 = −6.52845E−05, A8 = 3.00582E−06
A10 = 2.64970E−07, A12 = −1.38263E−08, A14 = 1.68143E−10, A16 = 4.23332E−13

Second surface

K = −2.08231E+00, A4 = −3.08738E−03, A6 = 5.61324E−05, A8 = −9.17779E−05
A10 = 2.67058E−05, A12 = −3.35873E−06, A14 = 2.10770E−07, A16 = −5.23405E−09

Third surface

K = 3.14225E+00, A4 = 4.58808E−04, A6 = −3.64809E−05, A8 = 1.59276E−05
A10 = 2.24510E−06, A12 = −3.90622E−07, A14 = 4.71993E−08, A16 = 5.86261E−10

Fourth surface

K = 7.29564E−01, A4 = 2.23941E−04, A6 = −1.68856E−05, A8 = 4.94818E−06
A10 = −4.16775E−07, A12 = 2.92135E−08, A14 = 4.43208E−11, A16 = −5.92285E−11

Tenth surface

K = −1.78103E+00, A4 = −6.04861E−04, A6 = −7.11562E−06, A8 = −1.20568E−06
A10 = −1.92762E−07, A12 = −9.26805E−09, A14 = 2.22427E−09, A16 = −7.45804E−11

Eleventh surface

K = 0.00000E+00, A4 = −1.10839E−03, A6 = 2.38457E−05, A8 = −2.93790E−06
A10 = −2.35991E−08, A12 = 8.07284E−09, A14 = −3.22190E−10, A16 = 1.73955E−11

TABLE 3

Various pieces of data

| | |
|---|---|
| Focal length | 6.0001 |
| F number | 1.60050 |
| View angle | 50.0000 |
| Imaged height | 3.5657 |
| Total lens length | 28.0039 |
| BF | 0.00000 |
| Entrance pupil position | 6.5878 |
| Exit pupil position | −17.6663 |
| Front-side principal point position | 10.5506 |
| Rear-side principal point position | 22.0084 |

TABLE 4

Single lens data

| Lens | Start surface | Focal length |
|---|---|---|
| 1 | 1 | −12.1056 |
| 2 | 3 | 44.4587 |
| 3 | 6 | 7.1608 |
| 4 | 8 | −10.1184 |
| 5 | 10 | 14.4505 |

Second Numerical Example

The second numerical example of the fixed-focus lens system corresponding to the second exemplary embodiment in FIG. 3 will be described below. Specifically, as the second numerical example of the fixed-focus lens system, surface data is indicated in (Table 5), aspherical data is indicated in (Table 6), various pieces of data are indicated in (Table 7), and single lens data is indicated in (Table 8).

TABLE 5

Surface data

| Surface number | r | d | nd | vd |
|---|---|---|---|---|
| Object surface | ∞ | | | |
| 1* | 4.08110 | 2.05440 | 1.88202 | 37.2 |
| 2* | 2.27200 | 2.80690 | | |
| 3 | −13.04840 | 2.16840 | 1.84666 | 23.8 |
| 4 | −9.10240 | 3.21910 | | |
| 5 (Diaphragm) | ∞ | 0.27980 | | |
| 6 | 10.57310 | 4.44670 | 1.61800 | 63.4 |
| 7 | −6.28810 | 0.14830 | | |
| 8 | −5.81950 | 0.65300 | 1.94595 | 18.0 |
| 9 | −8.49820 | 1.51000 | | |
| 10 | 6.77020 | 2.72530 | 1.61881 | 63.9 |
| 11 | −16.79150 | 0.74590 | | |
| 12 | −10.88950 | 1.23750 | 1.84666 | 23.8 |
| 13 | 85.20490 | 0.45000 | | |
| 14 | ∞ | 0.30000 | 1.51680 | 64.2 |

TABLE 5-continued

Surface data

| Surface number | r | d | nd | vd |
|---|---|---|---|---|
| 15 | ∞ | 1.89420 | | |
| 16 | ∞ | BF | | |
| Image surface | ∞ | | | |

TABLE 6

Aspherical data

First surface

K = −6.48903E−01, A4 = −1.21839E−03, A6 = −6.52166E−05, A8 = −8.98018E−06
A10 = 3.69732E−07, A12 = 1.26164E−08, A14 = −9.06043E−10, A16 = 1.33744E−11

Second surface

K = −9.23949E−01, A4 = −1.24351E−03, A6 = −1.16618E−04, A8 = −1.93374E−04
A10 = 4.02943E−05, A12 = −3.86397E−06, A14 = 1.93886E−07, A16 = −4.08561E−09

TABLE 7

Various pieces of data

| | |
|---|---|
| Focal length | 6.0000 |
| F number | 1.60082 |
| View angle | 50.0000 |
| Imaged height | 3.5681 |
| Total lens length | 24.0799 |
| BF | 0.00000 |
| Entrance pupil position | 8.3319 |
| Exit pupil position | −10.2818 |
| Front-side principal point position | 10.8310 |
| Rear-side principal point position | 18.0810 |

TABLE 8

Single lens data

| Lens | Start surface | Focal length |
|---|---|---|
| 1 | 1 | −12.4218 |
| 2 | 3 | 28.3962 |
| 3 | 6 | 7.0951 |
| 4 | 8 | −22.1412 |
| 5 | 10 | 8.1577 |
| 6 | 12 | −11.3372 |

Third Numerical Example

The third numerical example of the fixed-focus lens system corresponding to the third exemplary embodiment in FIG. 5 will be described below. Specifically, as the third numerical example of the fixed-focus lens system, surface data is indicated in (Table 9), aspherical data is indicated in (Table 10), various pieces of data are indicated in (Table 11), and single lens data is indicated in (Table 12).

TABLE 9

Surface data

| Surface number | r | d | nd | vd |
|---|---|---|---|---|
| Object surface | ∞ | | | |
| 1* | 4.91110 | 2.32560 | 1.80998 | 40.9 |
| 2* | 2.50780 | 2.42170 | | |
| 3* | −10.27940 | 3.24420 | 1.68948 | 31.0 |
| 4* | −7.77480 | 2.44470 | | |
| 5 (Diaphragm) | ∞ | 0.27980 | | |
| 6 | 7.41830 | 4.81150 | 1.61800 | 63.4 |
| 7 | −6.89990 | 0.58570 | | |
| 8 | −5.47160 | 0.65290 | 1.94595 | 18.0 |
| 9 | −9.72060 | 1.33040 | | |
| 10 | 6.34260 | 2.30790 | 1.61881 | 63.9 |
| 11 | ∞ | 1.30040 | | |
| 12 | −9.76050 | 0.68010 | 1.84666 | 23.8 |
| 13 | −25.81070 | 0.10000 | | |
| 14 | ∞ | 0.30000 | 1.51680 | 64.2 |
| 15 | ∞ | 1.84580 | | |
| 16 | ∞ | BF | | |
| Image surface | ∞ | | | |

TABLE 10

Aspherical data

First surface

K = −6.51516E−01, A4 = −1.52301E−03, A6 = −8.97365E−05, A8 = −2.52265E−06
A10 = 2.42587E−07, A12 = −4.25942E−11, A14 = −1.54169E−10, A16 = 1.72686E−12

Second surface

K = −9.73060E−01, A4 = −2.11490E−03, A6 = −3.75629E−04, A8 = −9.11995E−05
A10 = 2.70138E−05, , A12 = −3.41392E−06 A14 = 2.16328E−07, A16 = −5.26942E−09

Third surface

K = 9.85859E+00, A4 = 1.70786E−04, A6 = −6.44816E−05, A8 = −5.05973E−06
A10 = 8.19571E−07, A12 = −3.05187E−07, A14 = 3.71616E−08, A16 = 5.90222E−10

TABLE 10-continued

Aspherical data

Fourth surface

K = 8.44433E−01, A4 = −8.02188E−05, A6 = −4.62707E−05, A8 = 8.04661E−06
A10 = −9.99457E−07, A12 = 7.12456E−08, A14 = −2.85814E−10, A16 = −5.96287E−11

TABLE 11

Various pieces of data

| | |
|---|---|
| Focal length | 6.0000 |
| F number | 1.59947 |
| View angle | 50.0000 |
| Imaged height | 3.5670 |
| Total lens length | 24.0711 |
| BF | 0.00000 |
| Entrance pupil position | 7.4794 |
| Exit pupil position | −10.3076 |
| Front-side principal point position | 9.9886 |
| Rear-side principal point position | 18.0765 |

TABLE 12

Single lens data

| Lens | Start surface | Focal length |
|---|---|---|
| 1 | 1 | −11.1593 |
| 2 | 3 | 30.2761 |
| 3 | 6 | 6.6364 |
| 4 | 8 | −14.3011 |
| 5 | 10 | 10.2497 |
| 6 | 12 | −18.9060 |

Fourth Numerical Example

The fourth numerical example of the fixed-focus lens system corresponding to the fourth exemplary embodiment in FIG. 7 will be described below. Specifically, as the fourth numerical example of the fixed-focus lens system, surface data is indicated in (Table 13), aspherical data is indicated in (Table 14), various pieces of data are indicated in (Table 15), and single lens data is indicated in (Table 16).

TABLE 13

Surface data

| Surface number | r | d | nd | vd |
|---|---|---|---|---|
| Object surface | ∞ | | | |
| 1* | 7.74720 | 2.42100 | 1.80998 | 40.9 |
| 2* | 2.91100 | 1.99860 | | |
| 3* | −24.65800 | 3.38940 | 1.68948 | 31.0 |
| 4* | −7.74720 | 2.99060 | | |
| 5 (Diaphragm) | ∞ | 0.38740 | | |
| 6 | 7.68110 | 4.16410 | 1.61800 | 63.4 |
| 7 | −7.43320 | 0.00500 | 1.56732 | 42.8 |
| 8 | −7.43320 | 0.67790 | 1.94595 | 18.0 |
| 9 | −13.89360 | 2.64590 | | |
| 10* | 6.72480 | 3.19570 | 1.53445 | 55.7 |
| 11* | −60.61730 | 0.34930 | | |
| 12* | −22.07460 | 0.87160 | 1.63450 | 23.9 |
| 13* | 11.11750 | 0.40000 | | |
| 14 | ∞ | 0.30000 | 1.51680 | 64.2 |
| 15 | ∞ | 1.86960 | | |
| 16 | ∞ | BF | | |
| Image surface | ∞ | | | |

TABLE 14

Aspherical data

First surface

K = 5.58203E−01, A4 = −3.11488E−03, A6 = −5.83997E−05, A8 = 5.85495E−06
A10 = −3.74089E−08, A12 = −6.33653E−09, A14 = 1.71455E−10, A16 = −1.10058E−12

Second surface

K = −1.29449E+00, A4 = −3.64261E−03, A6 = −1.80793E−04, A8 = 4.05084E−05
A10 = −2.37290E−06, A12 = 1.41673E−07, A14 = −8.80863E−09, A16 = 2.90064E−10

Third surface

K = 0.00000E+00, A4 = −1.37563E−03, A6 = −1.92148E−04, A8 = 4.61483E−05
A10 = −1.47400E−05, A12 = 2.25461E−06, A14 = −1.65053E−07, A16 = 4.41044E−09

Fourth surface

K = 1.44109E+00, A4 = −6.37241E−05, A6 = −8.40727E−05, A8 = 1.85341E−05
A10 = −3.25242E−06, A12 = 3.84347E−07, A14 = −2.64723E−08, A16 = 7.74492E−10

Tenth surface

K = 1.77864E+00, A4 = −1.15401E−03, A6 = −2.14466E−04, A8 = 3.18923E−05
A10 = −6.29300E−06, A12 = 6.86105E−07, A14 = −4.41968E−08, A16 = 1.11086E−09

Eleventh surface

K = 0.00000E+00, A4 = −2.66991E−03, A6 = −3.18350E−04, A8 = 2.83919E−05
A10 = 6.34755E−07, A12 = −1.23820E−07, A14 = −3.14135E−09, A16 = 3.39902E−10

Twelfth surface

K = −1.50843E+01, A4 = −1.06100E−02, A6 = 5.87403E−04, A8 = 2.08860E−05
A10 = −1.98506E−06, A12 = −1.41247E−07, A14 = 1.31540E−08, A16 = −2.53818E−10

TABLE 14-continued

Aspherical data

Thirteenth surface

K = 0.00000E+00, A4 = −1.09154E−02, A6 = 1.10828E−03, A8 = −7.51641E−05
A10 = 4.26447E−06, A12 = −2.45904E−07, A14 = 9.09470E−09, A16 = −1.35184E−10

TABLE 15

Various pieces of data

| | |
|---|---|
| Focal length | 6.0001 |
| F number | 1.60021 |
| View angle | 50.0000 |
| Imaged height | 3.7014 |
| Total lens length | 24.8913 |
| BF | 0.00000 |
| Entrance pupil position | 6.1265 |
| Exit pupil position | −8.9154 |
| Front-side principal point position | 8.0855 |
| Rear-side principal point position | 18.8845 |

TABLE 16

Single lens data

| Lens | Start surface | Focal length |
|---|---|---|
| 1 | 1 | −7.4192 |
| 2 | 3 | 15.1451 |
| 3 | 6 | 6.8315 |
| 4 | 8 | −17.8075 |
| 5 | 10 | 11.5165 |
| 6 | 12 | −11.5353 |

Fifth Numerical Example

The fifth numerical example of the fixed-focus lens system corresponding to the fifth exemplary embodiment in FIG. 9 will be described below. Specifically, as the fifth numerical example of the fixed-focus lens system, surface data is indicated in (Table 17), aspherical data is indicated in (Table 18), various pieces of data are indicated in (Table 19), and single lens data is indicated in (Table 20).

TABLE 17

Surface data

| Surface number | r | d | nd | vd |
|---|---|---|---|---|
| Object surface | ∞ | | | |
| 1* | 7.50000 | 2.00000 | 1.80998 | 40.9 |
| 2* | 2.89650 | 2.21250 | | |
| 3* | −7.49880 | 3.50000 | 1.68893 | 31.1 |
| 4* | −6.68230 | 2.54150 | | |
| 5 (Diaphragm) | ∞ | 1.22880 | | |
| 6 | 6.45350 | 5.92000 | 1.61800 | 63.4 |
| 7 | −7.62830 | 0.52490 | | |
| 8 | −5.63610 | 0.70000 | 1.94595 | 18.0 |
| 9 | −13.77320 | 0.10000 | | |
| 10* | 8.12720 | 2.98000 | 1.55332 | 71.7 |
| 11* | −64.92820 | 0.00000 | | |
| 12 | ∞ | 0.35000 | | |
| 13 | ∞ | 0.30000 | 1.51680 | 64.2 |
| 14 | ∞ | 4.45360 | | |
| 15 | ∞ | BF | | |
| Image surface | ∞ | | | |

TABLE 18

Aspherical data

First surface

K = −3.51226E+00, A4 = −2.28839E−03, A6 = −3.4089E−05, 0E A8 = 1.35480E−06
A10 = 2.75491E−07, A12 = −1.32212E−08, A14 = 1.50706E−10, A16 = 7.58102E−13

Second surface

K = −1.88114E+00, A4 = 1.62890E−04, A6 = −1.29822E−04, A8 = −9.67276E−05
A10 = 2.72875E−05, A12 = −3.36511E−06, A14 = 2.10770E−07, A16 = −5.23405E−09

Third surface

K = 5.25768E+00, A4 = 2.62842E−04, A6 = −7.40198E−05, A8 = −9.14113E−06
A10 = 2.38240E−06, A12 = −3.90622E−07, A14 = 4.71993E−08, A16 = 5.86261E−10

Fourth surface

K = 5.78423E−01, A4 = −1.79093E−04, A6 = −3.71561E−05, A8 = 4.15986E−06
A10 = −4.16228E−07, A12 = 2.80913E−08, A14 = 4.43208E−11, A16 = −5.92285E−11

Tenth surface

K = −1.51749E+00, A4 = −5.37470E−04, A6 = −2.39310E−05, A8 = −4.98789E−07
A10 = −1.13123E−07, A12 = −1.32934E−08, A14 = 2.33847E−09, A16 = −7.45804E−11

Eleventh surface

K = 0.00000E+00, A4 = −6.77686E−06, A6 = −4.47534E−05, A8 = −2.24638E−07
A10 = −2.76113E−08, A12 = 6.32425E−09, A14 = −3.71674E−10, A16 = 2.01747E−11

TABLE 19

| Various pieces of data | |
| --- | --- |
| Focal length | 4.8645 |
| F number | 1.60011 |
| View angle | 70.0000 |
| Imaged height | 3.8234 |
| Total lens length | 26.8113 |
| BF | 0.00000 |
| Entrance pupil position | 5.1945 |
| Exit pupil position | −16.8904 |
| Front-side principal point position | 8.6581 |
| Rear-side principal point position | 21.9476 |

TABLE 20

| Single lens data | | |
| --- | --- | --- |
| Lens | Start surface | Focal length |
| 1 | 1 | −7.2321 |
| 2 | 3 | 32.4103 |
| 3 | 6 | 6.7390 |
| 4 | 8 | −10.5252 |
| 5 | 10 | 13.2466 |

(Values Corresponding to Conditions)

As described above, the fixed-focus lens system of any one of the first to fifth exemplary embodiments has been specifically implemented in the first to fifth numerical examples, respectively.

(Table 1) below illustrates values corresponding to the above conditions (1) to (7) in each numerical example.

TABLE 1

| | First numerical example | Second numerical example | Third numerical example | Fourth numerical example | Fifth numerical example |
| --- | --- | --- | --- | --- | --- |
| CONDITION (1) | 3.06 | 3.51 | 3.09 | 2.20 | 2.26 |
| CONDITION (2) | 7.41 | 4.73 | 5.05 | 2.52 | 6.66 |
| CONDITION (3) | −1.69 | −3.69 | −2.38 | −2.97 | −2.16 |
| CONDITION (4) | 2.41 | 1.36 | 1.71 | 1.92 | 2.72 |
| CONDITION (5) | 1.80998 | 1.88202 | 1.80998 | 1.80998 | 1.80998 |
| CONDITION (6) | 40.9 | 37.2 | 40.9 | 40.9 | 40.9 |
| CONDITION (7) | 0.21 | 0.25 | 0.25 | 0.24 | 0.18 |

As illustrated in (Table 1), it is shown that the fixed-focus lens system implemented in each numerical example satisfies the conditions (1) to (7).

As described above, the fixed-focus lens system that is excellent in various aberrations and the camera having the fixed-focus lens system can be provided.

The exemplary embodiments have been described above as examples of the technique in the present disclosure. For that purpose, the accompanying drawings and detailed descriptions have been provided.

Accordingly, the constituent elements described in the accompanying drawings and the detailed description may include not only the constituent elements essential for solving the problem but also constituent elements that are not essential for solving the problem in order to illustrate the technique. It should be noted for this reason that these unessential constituent elements being described in the accompanying drawings and detailed descriptions should not lead immediately to a conclusion that such unessential constituent elements are also essential.

Since the above exemplary embodiments are described as examples of the technique in the present disclosure, the exemplary embodiments may be subjected to various modifications, substitutions, additions, and omissions within the scope of claims and a scope equivalent thereto.

INDUSTRIAL APPLICABILITY

The present disclosure can be applied to fixed-focus lens systems for use in devices such as on-vehicle cameras, surveillance cameras, and web cameras. In particular, the present disclosure is beneficial for a fixed-focus lens system used in a camera such as an on-vehicle camera that is required to provide improved picture quality.

REFERENCE MARKS IN THE DRAWINGS

L1: first lens element
L2: second lens element
L3: third lens element
L4: fourth lens element
L5: fifth lens element
L6: sixth lens element
P: parallel plate
A: aperture diaphragm
S: image surface
100: on-vehicle camera
201: fixed-focus lens system
202: imaging device
401: display device
402: display device
403: display device
500: vehicle

The invention claimed is:

1. A fixed-focus lens system comprising, in order from an object side to an image side:
   a first lens element having negative power, the first lens element having a convex surface on the object side;
   a second lens element having positive power, the second lens element having a concave surface on the object side;
   a third lens element having positive power;
   a fourth lens element having negative power;
   a fifth lens element having positive power, and
   a sixth lens element having negative power, wherein
   a half angle of view of the fixed-focus lens system is 50 degrees or more,
   a shape of the convex surface on the object side of the first lens element has at least one inflection point at a part except for an optical axis, and
   a condition (5) and a condition (6) shown below are simultaneously satisfied, $$nL1 > 1.6 \quad (5)$$

$$vL1 > 30 \quad (6)$$

wherein,
nL1 is a refraction factor of the first lens element at a d-line, and
vL1 is an Abbe number of the first lens element.

2. The fixed-focus lens system according to claim 1, wherein a condition (1) shown below is satisfied, $$1.7 < (L1R1 + L1R2)/(L1R1 - L1R2) < 5.0 \quad (1)$$

wherein,

L1R1 is a radius of curvature of a surface on the object side of the first lens element, and L1R2 is a radius of curvature of a surface on the image side of the first lens element.

3. The fixed-focus lens system according to claim 1, wherein a condition (2) shown below is satisfied, $$2.1 < f2/f < 10.0 \tag{2}$$

wherein, f2 is a focal length of the second lens element at a d-line, and f is a focal length of an entire system at the d-line.

4. The fixed-focus lens system according to claim 1, wherein a condition (3) shown below is satisfied, $$-5.0 < f4/f < -1.0 \tag{3}$$

wherein, f4 is a focal length of the fourth lens element at a d-line, and f is a focal length of an entire system at the d-line.

5. The fixed-focus lens system according to claim 1, wherein a condition (4) shown below is satisfied, $$1.0 < f5/f < 5.0 \tag{4}$$

wherein, f5 is a focal length of the fifth lens element at a d-line, and f is a focal length of an entire system at the d-line.

6. The fixed-focus lens system according to claim 1, wherein a condition (7) shown below is satisfied, $$0.15 < f/TTL < 0.30 \tag{7}$$

wherein, f is a focal length of an entire system at a d-line, and

TTL is an entire optical length of the fixed-focus lens system.

7. The fixed-focus lens system according to claim 1, wherein a shape of a surface on the image side of the sixth lens element has at least one inflection point at the part except for the optical axis.

8. A camera comprising:

the fixed-focus lens system according to claim 1 to form an optical image of an object; and an imaging device configured to convert the optical image formed by the fixed-focus lens system into an electrical image signal.

9. A camera comprising:

the fixed-focus lens system according to claim 2 to form an optical image of an object; and an imaging device configured to convert the optical image formed by the fixed-focus lens system into an electrical image signal.

10. A camera comprising:

the fixed-focus lens system according to claim 3 to form an optical image of an object; and an imaging device configured to convert the optical image formed by the fixed-focus lens system into an electrical image signal.

11. A camera comprising:

the fixed-focus lens system according to claim 4 to form an optical image of an object; and an imaging device configured to convert the optical image formed by the fixed-focus lens system into an electrical image signal.

12. A camera comprising:

the fixed-focus lens system according to claim 5 to form an optical image of an object; and an imaging device configured to convert the optical image formed by the fixed-focus lens system into an electrical image signal.

13. A camera comprising:

the fixed-focus lens system according to claim 6 to form an optical image of an object; and an imaging device configured to convert the optical image formed by the fixed-focus lens system into an electrical image signal.

14. A camera comprising:

the fixed-focus lens system according to claim 6 to form an optical image of an object; and an imaging device configured to convert the optical image formed by the fixed-focus lens system into an electrical image signal.

* * * * *